(12) United States Patent
Adachi

(10) Patent No.: US 9,843,714 B2
(45) Date of Patent: Dec. 12, 2017

(54) CONTROL APPARATUS, IMAGING SYSTEM, CONTROL METHOD, AND STORAGE MEDIUM

(71) Applicant: CANON KABUSHIKI KAISHA, Tokyo (JP)

(72) Inventor: Takashi Adachi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/706,712

(22) Filed: May 7, 2015

(65) Prior Publication Data

US 2015/0326777 A1 Nov. 12, 2015

(30) Foreign Application Priority Data

May 12, 2014 (JP) .................................. 2014-098991

(51) Int. Cl.
*H04N 5/232* (2006.01)

(52) U.S. Cl.
CPC ..... *H04N 5/23216* (2013.01); *H04N 5/23206* (2013.01); *H04N 5/23293* (2013.01)

(58) Field of Classification Search
CPC ........... H04N 5/23216; H04N 5/23206; H04N 5/23293; H04N 5/23296; H04N 5/23238; G06K 9/46; G06K 2009/4666
See application file for complete search history.

(56) References Cited

U.S. PATENT DOCUMENTS

| 2005/0036036 A1* | 2/2005 | Stevenson ........ G08B 13/19608 348/211.99 |
| 2007/0064104 A1* | 3/2007 | Ikeda ............... G08B 13/19689 348/143 |
| 2012/0098769 A1* | 4/2012 | Nagasaka .......... G01C 21/3664 345/173 |
| 2014/0092262 A1* | 4/2014 | Otsuka ............... H04N 5/23222 348/207.1 |

FOREIGN PATENT DOCUMENTS

JP 11-220649 A 8/1999

* cited by examiner

*Primary Examiner* — Roberto Velez
*Assistant Examiner* — Tuan Le
(74) *Attorney, Agent, or Firm* — Canon U.S.A., Inc. IP Division

(57) ABSTRACT

A control apparatus includes an acquisition unit configured to acquire information indicating a speed at which an imaging apparatus changes an imaging range thereof, an input unit configured to input a first instruction for changing display of an image displayed on a display unit, a display control unit configured to, if the input unit has input the first instruction, change display of the image at a speed corresponding to the information acquired by the acquisition unit, and a transmission unit configured to transmit, to the imaging apparatus, a second instruction for changing the imaging range according to the display of the image being changed by the display control unit.

8 Claims, 7 Drawing Sheets

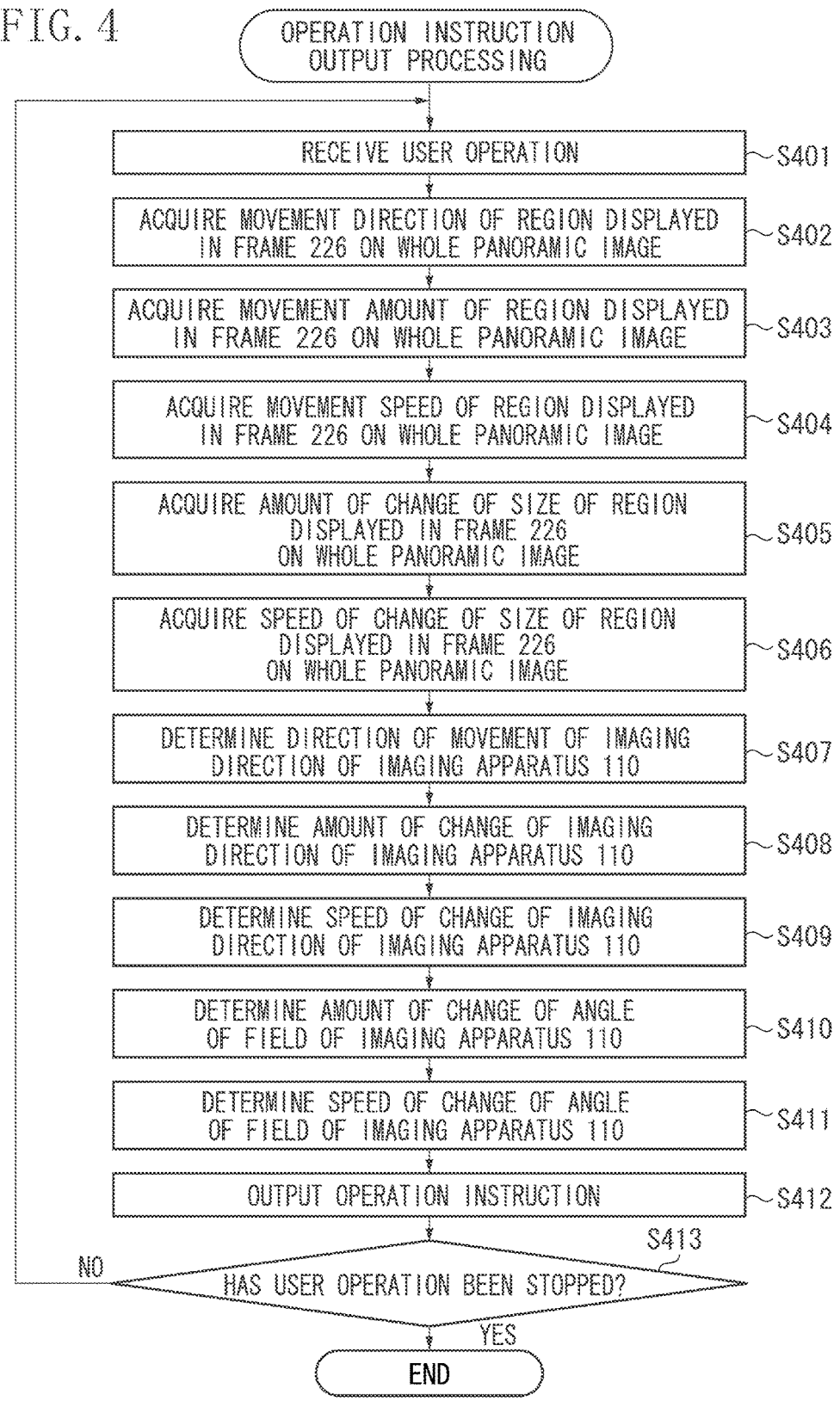

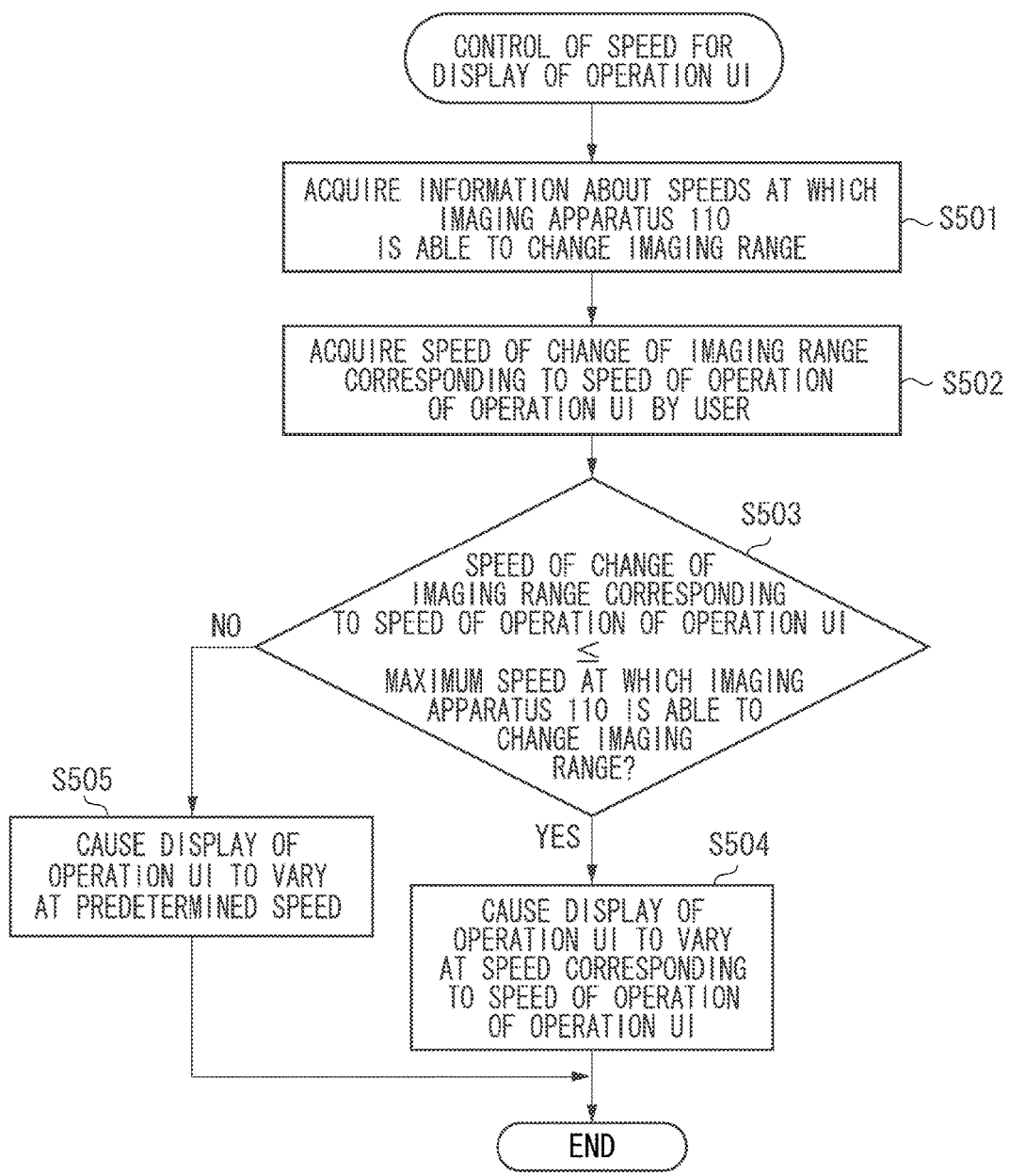

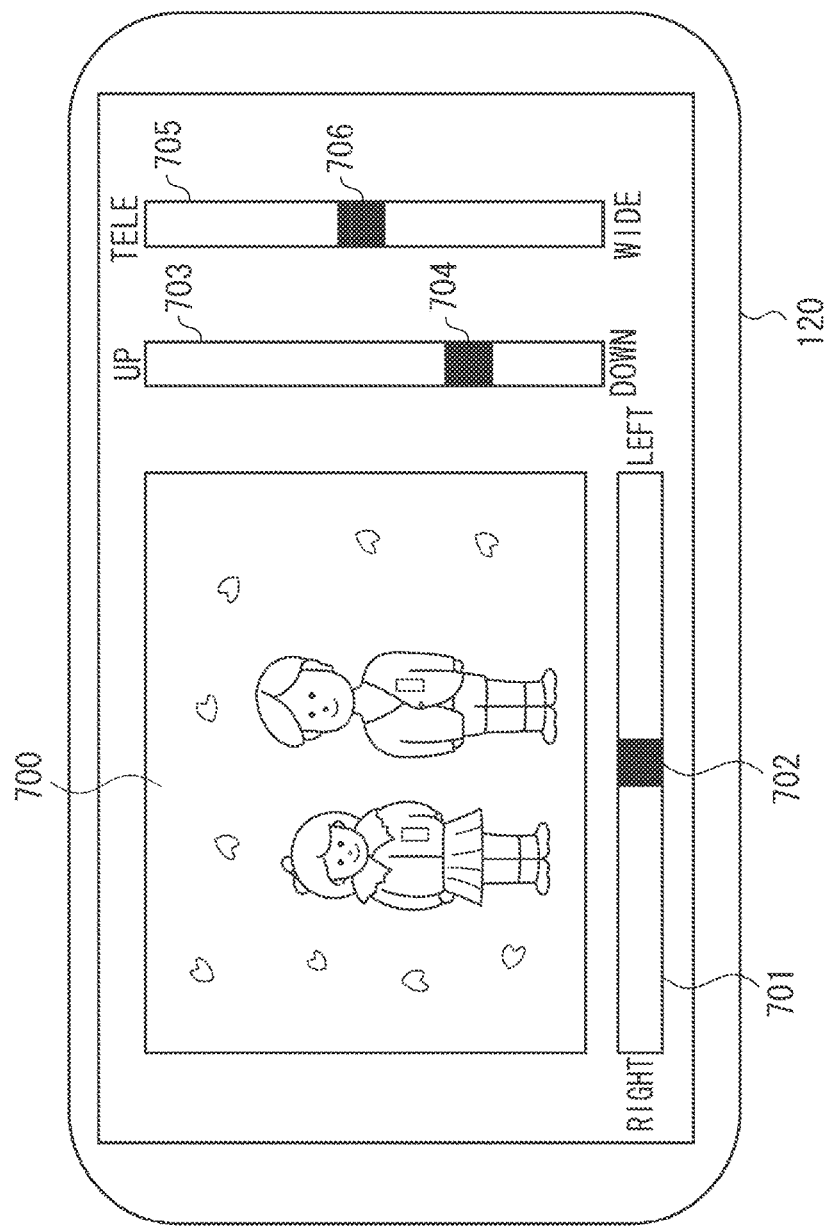

CONTROL APPARATUS, IMAGING SYSTEM, CONTROL METHOD, AND STORAGE MEDIUM

BACKGROUND OF THE INVENTION

Field of the Invention

The present invention relates to a control apparatus that controls the imaging range of an imaging apparatus.

Description of the Related Art

There is conventionally known an imaging system capable of changing the imaging range (for example, the imaging direction or angle of field) of an imaging apparatus in response to an instruction input from a client apparatus via a network.

Japanese Patent Application Laid-Open No. Hei 11-220649 discusses an imaging system capable of displaying, on a display screen of a client apparatus, a scroll bar that is a graphical user interface (GUI) used to input an instruction for changing the imaging direction or angle of field of an imaging apparatus.

In the client apparatus discussed in Japanese Patent Application Laid-Open No. Hei 11-220649, the user can change the position of a knob on the scroll bar to change the imaging direction or angle of field of the imaging apparatus.

However, in such a conventional imaging system, the actual change of the imaging range of an imaging apparatus may, in some cases, disaccord with the user operation.

Furthermore, in the imaging system discussed in Japanese Patent Application Laid-Open No. Hei 11-220649, the user is allowed to change the position of the knob on the scroll bar displayed on the display screen at a desired speed.

On the other hand, the upper limit of speeds at which the imaging apparatus is able to change the imaging range is limited to a maximum speed at which a mechanism that changes the imaging range of the imaging apparatus is able to physically operate.

In an example discussed in Japanese Patent Application Laid-Open No. Hei 11-220649, the user may, in some cases, input an instruction for changing the imaging range at a speed exceeding the upper limit of speeds at which the imaging apparatus is able to change the imaging range.

SUMMARY OF THE INVENTION

The present invention features, among other things, a control apparatus capable of causing the user operation and the actual change of the imaging range of an imaging apparatus to correspond to each other.

According to an aspect of the present invention, a control apparatus includes an acquisition unit configured to acquire information indicating a speed at which an imaging apparatus changes an imaging range thereof, an input unit configured to input a first instruction for changing display of an image displayed on a display unit, a display control unit configured to, if the input unit has input the first instruction, change display of the image at a speed corresponding to the information acquired by the acquisition unit, and a transmission unit configured to transmit, to the imaging apparatus, a second instruction for changing the imaging range according to the display of the image being changed by the display control unit.

According to another aspect of the present invention, a control apparatus includes an acquisition unit configured to acquire information indicating a direction in which an imaging apparatus changes an imaging direction thereof, an input unit configured to input a first instruction for changing display of an image displayed on a display unit, a display control unit configured to, if the input unit has input the first instruction, change display of the image in a direction corresponding to the information acquired by the acquisition unit, and a transmission unit configured to transmit, to the imaging apparatus, a second instruction for changing the imaging direction of the imaging apparatus according to the display of the image being changed by the display control unit.

Further features of the present invention will become apparent from the following description of exemplary embodiments with reference to the attached drawings.

BRIEF DESCRIPTION OF THE DRAWINGS

FIG. 4 is a flowchart illustrating output processing of an operation instruction, which the terminal apparatus outputs to the imaging apparatus.

FIG. 5 is a flowchart illustrating control of a speed at which to change display of an operation user interface (UI).

FIG. 7 illustrates an example of an operation UI according to a second exemplary embodiment.

DESCRIPTION OF THE EMBODIMENTS

Figure 1:
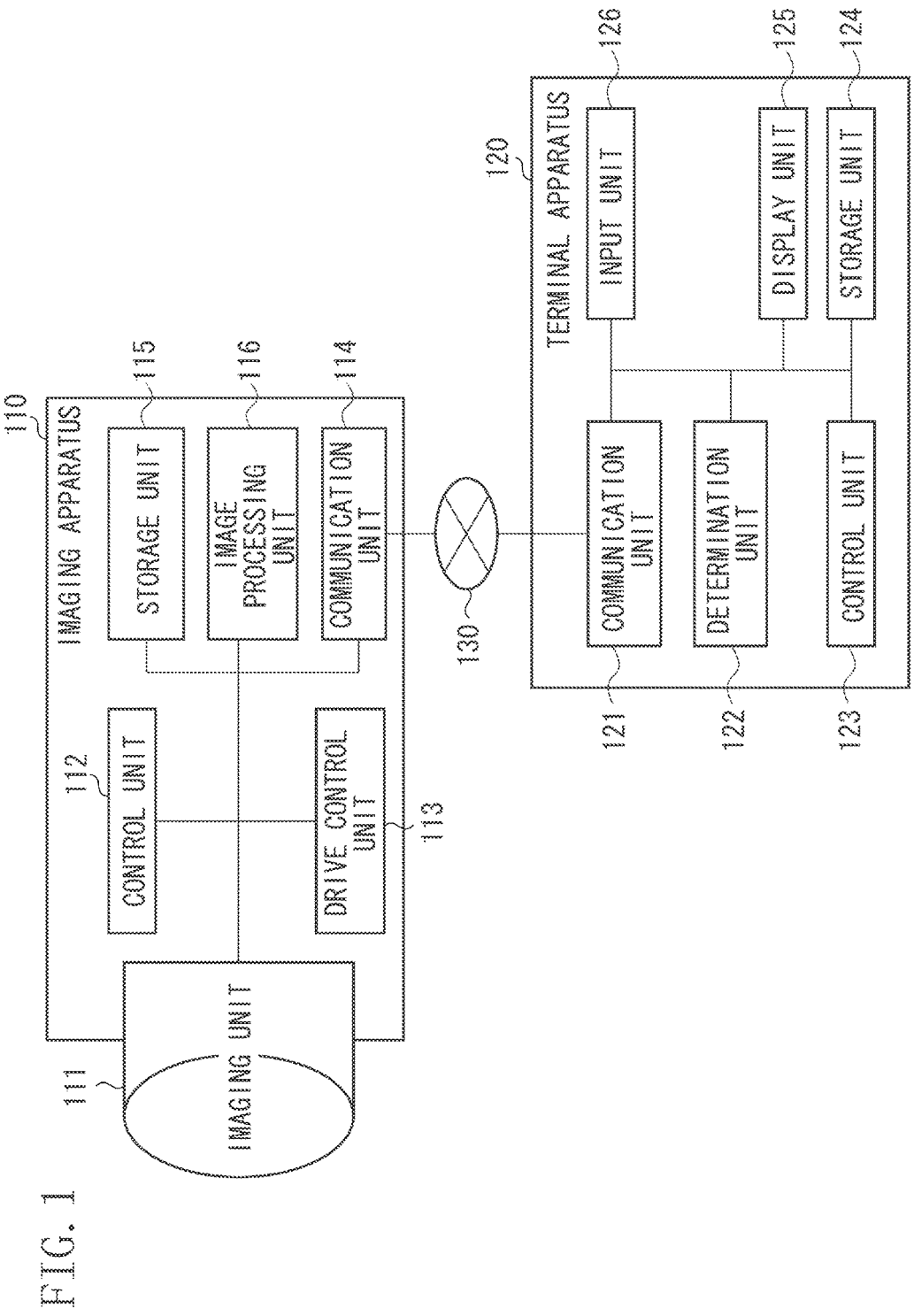
FIG. 1 illustrates an imaging system according to a first exemplary embodiment.

Various exemplary embodiments, features, and aspects of the invention will be described in detail below with reference to the drawings.

An imaging system according to a first exemplary embodiment is described below with reference to FIG. 1. The imaging apparatus illustrated in FIG. 1 includes an imaging apparatus 110 and a terminal apparatus 120, which are interconnected via a network 130. A plurality of imaging apparatuses 110 may be connected to the network 130.

The imaging apparatus 110 is able to capture an image while changing the imaging range thereof. The imaging apparatus 110 can be used as a network camera.

The terminal apparatus 120 is a control apparatus that performs control to change an imaging range within which the imaging apparatus 110 captures an image. The terminal apparatus 120 may be, for example, a personal computer (PC). Alternatively, the terminal apparatus 120 may be a portable terminal, such as a tablet terminal or a smartphone.

An image captured by the imaging apparatus 110 is transmitted to the terminal apparatus 120 via the network 130, and is then displayed on a display unit 125 of the terminal apparatus 120.

In the present exemplary embodiment, the terminal apparatus 120 causes the display unit 125 to display a part or the whole of a panoramic image, which is an image indicating a range within which the imaging apparatus 110 is able to capture an image while changing the imaging direction or angle of field.

The terminal apparatus 120 is able to change a range associated with a first region (a display region 222 illustrated in FIG. 2) on a display screen of the terminal apparatus 120, among a range (a range 210 illustrated in FIG. 2) within which the imaging apparatus 110 is able to capture an image while changing the imaging range thereof, based on an operation on the display screen.

In the present exemplary embodiment, an example is described in which the terminal apparatus 120 includes the display unit 125. However, this is not restrictive. For example, the terminal apparatus 120 may be configured to control an external display device connected to the terminal apparatus 120 and to cause the external display device to display a captured image received from the imaging apparatus 110.

The network 130 is composed of, for example, the Internet, a wired local area network (LAN), a wireless LAN, a wide area network (WAN), or an analog cable. The network 130 does not have restrictions on communication standard, scale, and structure. For example, Ethernet can be used as the communication standard of the LAN.

First, the configuration of the imaging apparatus 110 is described with reference to FIG. 1.

An imaging unit 111 captures an object image to generate a captured image. The imaging unit 111 is composed of lens units, an image sensor, such as a complementary metal-oxide semiconductor (CMOS) sensor, etc. The image sensor converts an object image formed by the lens units into an image signal to generate a captured image. The imaging direction of the imaging unit 111 is able to be changed by the control of a drive control unit 113, which is described below.

An image processing unit 116 performs image processing on an image signal generated by the imaging unit 111. for example, the image processing unit 116 performs coding of an image captured by the imaging unit 111. The coding method includes, for example, Joint Photographic Experts Group (JPEG). Alternatively, the coding method includes H.264/MPEG-4 AVC (hereinafter referred to as "H.264"). Further alternatively, the coding method includes High Efficiency Video Coding (HEVC). The coding method is not restricted to such coding methods. Furthermore, the image processing unit 116 may select a coding method from among a plurality of coding methods to perform coding.

Furthermore, the image processing unit 116 generates a panoramic image by combining images captured in a plurality of imaging directions by the imaging unit 111. In the present exemplary embodiment, the image processing unit 116 generates a panoramic image of an area corresponding to a range within which the imaging apparatus 110 is able to capture an image while changing the imaging direction or the zoom setting. The coding method for a panoramic image includes, for example, JPEG, Portable Network Graphics (PNG), Graphics Interchange Format (GIF), and Bit Map Image (BMP). Alternatively, the coding method for a panoramic image includes H.264 and HEVC.

The image processing unit 116 can be composed of, for example, a processor, such as a central processing unit (CPU). Alternatively, the image processing unit 116 can be composed of a processor for image processing, such as a graphics processing unit (GPU).

In the present exemplary embodiment, an example is described in which the image processing unit 116 of the imaging apparatus 110 generates a panoramic image. However, this is not restrictive. For example, the terminal apparatus 120 may generate a panoramic image. More specifically, the terminal apparatus 120 may generate a panoramic image by combining a plurality of captured images received from the imaging apparatus 110. Alternatively, a server (not illustrated) connected to the network 130 may generate a panoramic image by combining a plurality of images captured by the imaging apparatus 110. The terminal apparatus 120 may acquire the panoramic image generated by the server via the network 130. There are no restrictions on which apparatus generates a panoramic image.

The drive control unit 113 performs control to change the imaging direction or angle of field of the imaging unit 111. In the present exemplary embodiment, the drive control unit 113 performs control to change the imaging direction of the imaging unit 111 in panning directions and tilting directions. Furthermore, in the present exemplary embodiment, the drive control unit 113 changes the angle of field of the imaging range of the imaging unit 111 by changing the zoom ratio. In the present exemplary embodiment, the drive control unit 113 changes the imaging direction of the imaging unit 111 by controlling the operation of a mechanical driving mechanism configured to change the imaging direction of the imaging unit 111. Furthermore, in the present exemplary embodiment, the drive control unit 113 changes the angle of field of the imaging range of the imaging unit 111 by changing the positions of a plurality of lens units included in the imaging unit 111.

In the present exemplary embodiment, an example is described in which the imaging apparatus 110 is able to change the imaging direction in panning directions and tilting directions and to change the imaging angle of field. However, this is not restrictive.

The present exemplary embodiment can also be applied to an imaging apparatus 100 that is able to change the imaging direction in at least one direction and that does not have the function to change the angle of field. Furthermore, the present exemplary embodiment can also be applied to an imaging apparatus 100 that does not have the function to change the imaging direction and that has the function to change the imaging angle of field.

In the present exemplary embodiment, an example is described in which the imaging apparatus 110 includes the drive control unit 113. However, this is not restrictive. For example, a pan/tilt head that is attached to the imaging apparatus 110 may be driven to change the imaging direction of the imaging unit 111.

A storage unit 115 stores capability information, which is information corresponding to speeds at which the imaging apparatus 110 is able to change the imaging range (for example, a pan angle, a tilt angle, or a zoom ratio). The capability information includes, for example, a value corresponding to the amount of change of the imaging range per unit time. The speed indicated by the capability information is a value corresponding to the acceleration at which the imaging apparatus 110 changes the imaging range. The speed at which to change the imaging range includes speeds or accelerations at which a mechanical driving mechanism configured to change the imaging direction of the imaging apparatus 110 is able to change the imaging direction in panning directions or tilting directions. The speed at which to change the imaging range further includes speeds or accelerations at which the angle of field of the imaging apparatus 110 is varied by varying the positions of lens units included in the imaging unit 110.

Furthermore, the storage unit 115 stores a captured image, which has been obtained by the imaging unit 115 capturing an image and on which the image processing unit 116 has performed image processing. The storage unit 115 further stores a panoramic image generated by the image processing unit 116. The storage unit 115 yet further stores control parameters, which are used by a control unit 112, described below.

The storage unit 115 can be, for example, a memory, such as a random access memory (RAM) or a read-only memory (ROM). Alternatively, the storage unit 115 may be a recording medium, such as a hard disk drive (HDD). Furthermore, the storage unit 115 may be a removable medium, such as a flash memory or a memory card.

A captured image and a panoramic image may be recorded on an external storage device connected to the imaging apparatus 110. For example, a captured image or a panoramic image may be recorded in a memory card loaded in the imaging apparatus 110. Alternatively, a captured image or a panoramic image may be recorded in a network attached storage (NAS) (not illustrated) connected to the network 130.

A communication unit 114 transmits a captured image, which has been obtained by the imaging unit 115 capturing an image and on which the image processing unit 116 has performed image processing, to the terminal apparatus 120. The communication unit 114 further transmits a panoramic image generated by the image processing unit 116 to the terminal apparatus 120. Furthermore, the communication unit 114 receives a control command, which the terminal apparatus 120 issues to the imaging apparatus 110. The control command, which is issued to the imaging apparatus 110, includes, for example, a command to change the imaging direction of the imaging unit 111. The control command, which is issued to the imaging apparatus 110, further includes a command to change the angle of field of the imaging unit 111.

The control unit 112 controls various units of the imaging apparatus 110 illustrated in FIG. 1. The control unit 112 can be, for example, a processor, such as a CPU. When the control unit 112 is composed of a processor, for example, the control unit 112 executes programs stored in the storage unit 115 to control the various units of the imaging apparatus 110.

Next, the configuration of the terminal apparatus 120 is described with reference to FIG. 1.

A communication unit 121 acquires a captured image from the imaging apparatus 110. The communication unit 121 further acquires a panoramic image. Furthermore, the communication unit 121 outputs, to the imaging apparatus 110, an operation instruction for the imaging apparatus 110. The operation instruction is, for example, generated based on an input signal, which is input by the user operating an input unit 126, described below, and is then transmitted to the imaging apparatus 110. In the present exemplary embodiment, the terminal apparatus 120 is able to specify, via the operation instruction, a speed or acceleration at which the imaging apparatus 110 changes the imaging direction.

Furthermore, in the present exemplary embodiment, the communication unit 121 acquires first information indicating a speed at which the imaging apparatus 110 changes the imaging range. The speed indicated by the first information includes, for example, speeds at which a mechanical driving mechanism configured to change the imaging direction of the imaging apparatus 110 is able to change the imaging direction in panning directions or tilting directions. The speed indicated by the first information further includes, for example, speeds at which the angle of field of the imaging apparatus 110 is varied by varying the positions of lens units included in the imaging unit 110.

Furthermore, in the present exemplary embodiment, the communication unit 121 acquires second information indicating a direction in which the imaging apparatus 110 changes the imaging direction. The second information is, for example, information indicating a type of the direction in which the imaging apparatus 110 changes the imaging direction with a single action. For example, the second information is information indicating that the imaging apparatus 110 is able to move the imaging direction in a panning direction with a single action. Furthermore, for example, the second information is information indicating that the imaging apparatus 110 is able to move the imaging direction in a tilting direction with a single action.

In the present exemplary embodiment, an example is described in which the communication unit 121 acquires the first information and the second information from the imaging apparatus 110. However, there are no restrictions on from which apparatus the communication unit 121 acquires the first information and the second information. For example, a storage device (not illustrated) connected to the network 130 may store the first information and the second information about the imaging apparatus 110. Then, the communication unit 121 may acquire the first information and the second information from the storage device.

The communication unit 121 stores the acquired first information and second information into a storage unit 124. The communication unit 121 may be configured to acquire only one of the first information and the second information. Furthermore, the storage unit 124 may be configured to store only one of the first information and the second information.

The communication unit 121 outputs, to the imaging apparatus 110, an instruction to cause the imaging apparatus 110 to capture an image within an imaging range corresponding to a second region (a region indicated by a frame 226 illustrated in FIG. 2), which is a part of the first region (the display region 222 illustrated in FIG. 2) on the display screen of the terminal apparatus 120.

In the present exemplary embodiment, an example is described in which the terminal apparatus 120 acquires a panoramic image. However, this is not restrictive. The terminal apparatus 120 may use, instead of a panoramic image, a previously prepared image, which indicates a range within which the imaging apparatus 110 is able to capture an image while changing the imaging range.

For example, the terminal apparatus 120 may acquire and use, instead of a panoramic image, a map indicating a range within which the imaging apparatus 110 is able to capture an image while changing the imaging range. Similar to a panoramic image, there are no restrictions on from which apparatus the terminal apparatus 120 acquires such an image. Such an image may be acquired from the imaging apparatus 110. Such an image may also be acquired from the storage unit 124 of the terminal apparatus 120. Alternatively, such an image may be acquired from a storage device (not illustrated) connected to the network 130.

The storage unit 124 stores a captured image acquired by the communication unit 121. Furthermore, the storage unit 124 stores a panoramic image acquired by the communication unit 121.

A display unit 125 displays an operation user interface (UI), which the user uses to change the imaging range of the imaging apparatus 110. The display unit 125 is, for example, a display of the terminal apparatus 120. In a case where the terminal apparatus 120 is a tablet terminal or smartphone, the operation UI is displayed on a display of the tablet terminal or smartphone. The display unit 125 also displays an image captured by the imaging apparatus 110 as described above.

Figure 2:
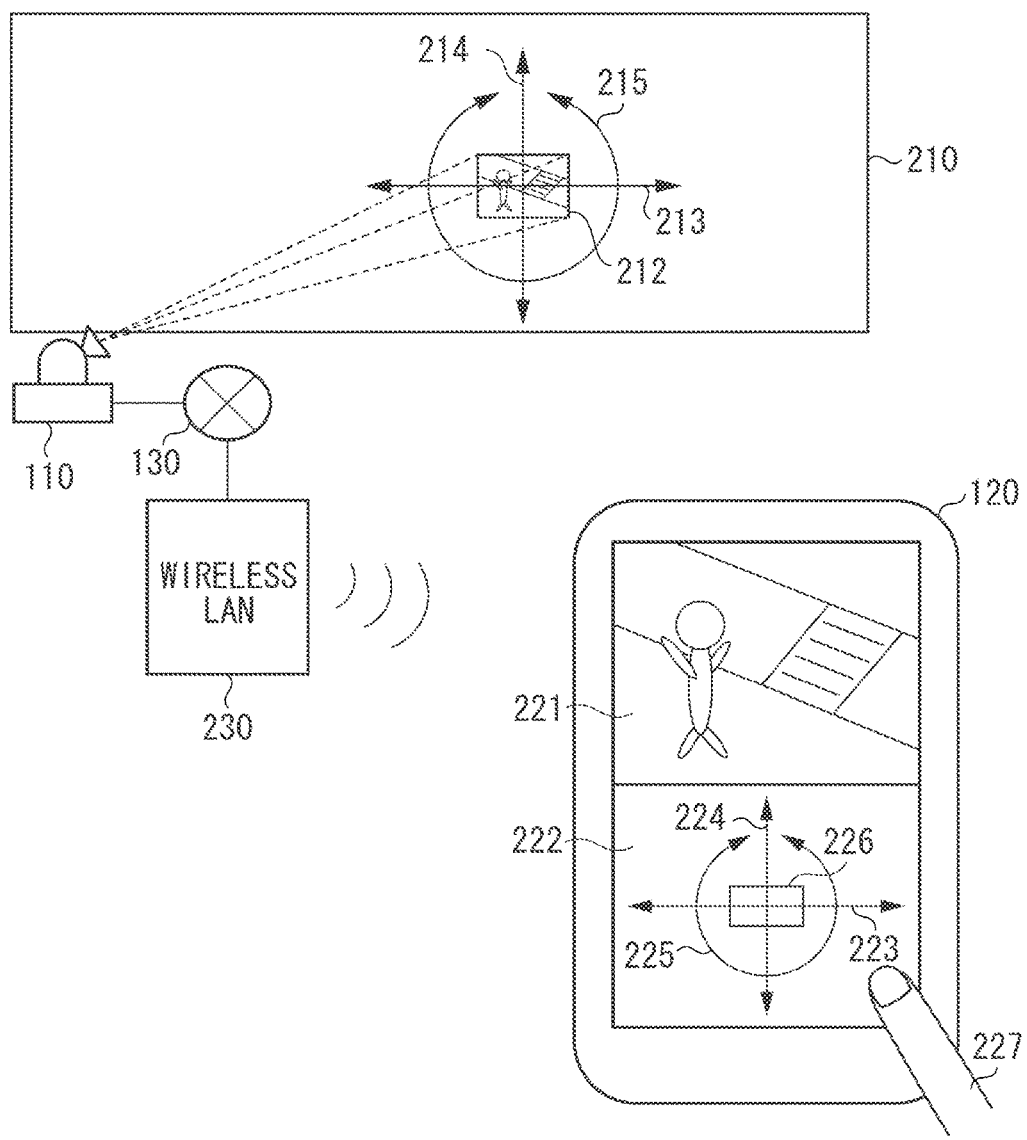
FIG. 2 illustrates an example of an operation for changing the imaging range of an imaging apparatus.

In the present exemplary embodiment, an image displayed in the display region 222 illustrated in FIG. 2 corresponds to the operation UI. In the present exemplary embodiment, the user is allowed to change the imaging range of the imaging apparatus 110 by moving, enlarging, or reducing an image displayed in the display region 222. The terminal apparatus 120 transmits, to the imaging apparatus 110, a command to cause the imaging apparatus 110 to capture an image within an imaging range corresponding to an image that is displayed within the predetermined frame 226 as a result of the user moving, enlarging, or reducing an image displayed in the display region 222. Here, in the present exemplary embodiment, the image displayed in the display region 222 is a part or the whole of a panoramic image corresponding to a range within which the imaging apparatus 110 is able to capture an image. In the present exemplary embodiment, an imaging region corresponding to the image displayed within the predetermined frame 226 indicates the imaging position of the imaging apparatus 110.

In the present exemplary embodiment, when an instruction corresponding to the user operation is input from the input unit 126, which is described below, the display unit 125 varies display of the image at a speed corresponding to the above-described first information or second information acquired by the communication unit 121.

In the present exemplary embodiment, the display unit 125 displays a captured image and a panoramic image according to the control of a control unit 123, which is described below. The display unit 125 displays the captured image, which is received from the imaging apparatus 110, in a display region 221 on the display screen of the terminal apparatus 120, as described below with reference to FIG. 2. Furthermore, the display unit 125 displays a part or the whole of the panoramic image in the display region 222 (the first region) on the display screen.

The user is allowed to perform an operation on the display screen of the terminal apparatus 120 to change a range within which an image within the whole panoramic image is to be displayed in the display region 222.

In the present exemplary embodiment, the display unit 125 further displays the frame 226 in superimposition on the panoramic image. The frame 226 is a frame indicating a region (the second region) indicating an imaging range within which the terminal apparatus 120 causes the imaging unit 111 of the imaging apparatus 110 to capture an image in the range represented by the displayed panoramic image. The terminal apparatus 120 controls the imaging direction and angle of field of the captured image in such a manner that the imaging range of the imaging apparatus 110 becomes coincident with a range corresponding to the region indicated by the frame 226 in the panoramic image.

In the present exemplary embodiment, the terminal apparatus 120 outputs, to the imaging apparatus 110, a command to cause the imaging apparatus 110 to capture an image within an imaging range corresponding to the second region (the region indicated by the frame 226), which is a part of the first region (the display region 222), on the display screen, thus controlling the imaging range of the captured image.

The display unit 125 displays the frame 226 at a predetermined position in the display region 222. For example, the display unit 125 displays the frame 226 in such a manner that the region indicated by the frame 226 (the second region) contains the center of the display region 222 (the first region). Alternatively, the display unit 125 may be configured to allow the user to set the position where the frame 226 is to be displayed in the display region 222.

The display unit 125 may be configured to switch whether to display the frame 226 according to an instruction from the user. Further, in the present exemplary embodiment, an example is described in which the display unit 125 displays the frame 226. However, the display unit 125 does not necessarily need to display the frame 226.

In the present exemplary embodiment, it is supposed that the size of the frame 226, which the display unit 125 displays, is constant. However, the display unit 125 may be configured to allow the user to change the size of the frame 226 relative to the size of the display region 222.

The input unit 126 receives an operation performed by the user on the display screen of the terminal apparatus 120. In the present exemplary embodiment, the input unit 126 receives an instruction to change display of an image displayed on the display unit 125. For example, the input unit 126 receives an operation performed on a touch panel included in the terminal apparatus 120. The operation performed by the user on the touch panel includes touch operations, such as tap, swipe, flick, pinch-in, and pinch-out. Alternatively, the input unit 126 is able to receive an operation performed by the user via a mouse or keyboard connected to the terminal apparatus 120.

The content of an operation by the user and the content of an operation instruction which the terminal apparatus 120 outputs to the imaging apparatus 110 according to an operation of the user are described in detail with reference to FIGS. 2 to 5.

A determination unit 122 determines the content of an operation instruction, which the terminal apparatus 120 transmits to the imaging apparatus 110, according to the content of an operation received by the input unit 126.

For example, the determination unit 122 determines a control value, which is used to move the imaging direction of the imaging apparatus 110 in a panning direction or tilting direction, according to the amount of operation on the input unit 126. Alternatively, the determination unit 122 determines a control value, which is used to enlarge or reduce the angle of field of the imaging apparatus 110, according to the amount of operation on the input unit 126.

The determination unit 122 may be configured to determine the amount of change used to change the imaging range according to only one of the distance by which the position of an image displayed in the display region 222 has been changed and the ratio at which the size of an image displayed in the display region 222 has been changed.

Furthermore, the determination unit 122 determines a speed and a direction that are used to change the imaging direction of the imaging apparatus 110.

First, the determination unit 122 specifies a speed of change of the imaging range of the imaging apparatus 110 corresponding to an instruction input by the input unit 126. In other words, the determination unit 122 specifies a speed of change of the imaging range of the imaging apparatus 110 corresponding to the speed at which the user operates and changes an image displayed on the display unit 125.

Then, the determination unit 122 determines a speed at which to change an image displayed on the display unit 125 based on the above-mentioned first information and the specified speed of change.

Furthermore, the determination unit 122 specifies a direction of change of the imaging direction of the imaging apparatus 110 corresponding to an instruction input by the input unit 126. In other words, the determination unit 122 specifies a direction of change of the imaging direction of the imaging apparatus 110 corresponding to a direction in which the user operates and changes an image displayed on the display unit 125.

Then, the determination unit 122 determines a direction in which to change an image displayed on the display unit 125 based on the above-mentioned second information and the specified direction of change.

Here, the first information is information, which is acquired by the communication unit 121, indicating a speed at which the imaging apparatus 110 changes the imaging range. The second information is information, which is acquired by the communication unit 121, indicating a direction in which the imaging apparatus 110 is able to change the imaging direction.

The above-mentioned communication unit 121 outputs, to the imaging apparatus 110, an instruction to change the imaging range of the imaging apparatus 110 according to a result determined by the determination unit 122. In other words, the communication unit 121 transmits, to the imaging apparatus 110, an instruction to change the imaging range of the imaging apparatus 110 according to a change of the image displayed in the display region 222.

The communication unit 121 transmits, to the imaging apparatus 110, an instruction to change the imaging range according to a change of an image displayed on the display unit 125. Furthermore, the communication unit 121 transmits, to the imaging apparatus 110, an instruction to change the imaging direction of the imaging apparatus 110 according to a change of display of an image displayed on the display unit 125.

In the present exemplary embodiment, an example is described in which the terminal apparatus 120 determines a speed at which to change the imaging range of the imaging apparatus 110 and a direction in which to change the imaging direction of the imaging apparatus 110 and instructs the imaging apparatus 110 to change the imaging range at the determined speed and to change the imaging direction in the determined direction. However, this is not restrictive. For example, the terminal apparatus 120 may transmit, to the imaging apparatus 110, a value determined depending on an operation performed by the user, and the imaging apparatus 110 may determine a speed and a direction used to change the imaging range, based on the value received from the terminal apparatus 120.

The control unit 123 controls various units of the terminal apparatus 120 illustrated in FIG. 1. For example, the control unit 123 controls the display unit 125 to perform display control, thus causing the display unit 125 to display the captured image, a part or the whole of the panoramic image, and the frame 226.

The control unit 123 controls a change of an image displayed on the display unit 125. When the input unit 126 receives an instruction from the user, the control unit 123 performs display control to change display of an image displayed on the display unit 125 at a speed corresponding to the first information acquired by the communication unit 121. Furthermore, when the input unit 126 receives an instruction from the user, the control unit 123 performs display control to change display of an image displayed on the display unit 125 in a direction corresponding to the second information acquired by the communication unit 121. Here, the first information is information, which is acquired by the communication unit 121, indicating a speed at which the imaging apparatus 110 changes the imaging range. The second information is information, which is acquired by the communication unit 121, indicating a direction in which the imaging apparatus 110 is able to change the imaging direction.

The control unit 123 can be, for example, a processor, such as a CPU. When the control unit 123 is composed of a processor, for example, the control unit 123 executes programs stored in the storage unit 124 to control the various units of the terminal apparatus 120.

Next, an example in which the user operates the terminal apparatus 120 to change the imaging range of the imaging apparatus 110 is described with reference to FIGS. 2 to 5.

In the example illustrated in FIG. 2, the imaging apparatus 110 is a network camera that is capable of changing the imaging direction in panning directions and tilting directions. The imaging apparatus 110 has a zoom mechanism and is able to change the angle of field of the imaging range.

In FIG. 2, a range 210 represents the range of an imaging target the image of which the imaging apparatus 110 is able to capture while changing the imaging direction and the angle of field of the imaging apparatus 110. Furthermore, in FIG. 2, a frame 212, which indicates an imaging range, represents a range within which the imaging apparatus 110 is currently capturing an image.

The imaging apparatus 110 combines a plurality of images captured while changing the imaging direction of the imaging apparatus 110, thus generating a panoramic image of the range corresponding to the range 210. The generated panoramic image is transmitted to the terminal apparatus 120 via the network 130.

In the present exemplary embodiment, an example is described in which the imaging apparatus 110 generates and transmits a panoramic image. However, the terminal apparatus 120 may generate a panoramic image by using a plurality of images captured by the imaging apparatus 110.

Furthermore, in the example illustrated in FIG. 2, the terminal apparatus 120 is a tablet terminal that controls pan, tilt, and zoom of the imaging apparatus 110. The terminal apparatus 120 performs communication with the imaging apparatus 110 via the network 130. In the example illustrated in FIG. 2, the terminal apparatus 120 performs communication with the imaging apparatus 110 via a wireless LAN 230.

The terminal apparatus 120 displays a captured image, which is captured by the imaging apparatus 110, in the display region 221 on the display screen. Furthermore, the terminal apparatus 120 displays a part or the whole of the acquired panoramic image in the display region 222 on the display screen. The layout of display of the display region 221 and the display region 222 is not limited to the example illustrated in FIG. 2, but may be arbitrarily arranged.

The terminal apparatus 120 may be configured to display, instead of a panoramic image, a part or the whole of a map image, which indicates a range within which the imaging apparatus 110 is able to capture an image while changing the imaging range, in the display region 222.

Furthermore, in the example illustrated in FIG. 2, the frame 226 is displayed at a predetermined position within the display region 222. The frame 226 indicates a range corresponding to the imaging range of the imaging apparatus 110. Thus, the terminal apparatus 120 displays, in the display region 222 (the first display region), an image corresponding to a range that contains an imaging range the image of which the imaging apparatus 110 captures (the range indicated by the frame 226) and that is larger than the imaging range. This displaying operation is executed by the control unit 123 controlling the display unit 125.

The user is allowed to operate the terminal apparatus 120 to determine within which range an image in the whole panoramic image is to be displayed in the display region 222.

Thus, the terminal apparatus 120 changes, based on an instruction received from the user, a range associated with the first region (the display region 222) in the range (for example, a panoramic image) within which the imaging apparatus 110 is able to capture an image while changing the imaging range. This changing control is executed by the control unit 123 changing an image to be displayed on the display unit 125, based on an instruction received by the input unit 126.

For example, the user positions the finger 227 on an image displayed in the display region 222 on the display screen and then performs a swipe operation in a vertical direction 224, a horizontal direction 223, or an oblique direction. In this way, the user can change a region to be displayed in the display region 222 in the region of a panoramic image in a vertical direction, a horizontal direction, or an oblique direction. Thus, the user can move an image to be displayed in the display region 222.

Here, the swipe operation is an operation to move the finger 227 between two points on the screen while keeping the finger 227 in contact with or in vicinity to the operation screen. The swipe operation may be performed using an operation tool, such as a touch pen, instead of a finger.

Moving an image displayed in the display region 222 results in a change of an image displayed within the frame 226. According to this change, the imaging direction of the imaging apparatus 110 is changed. For example, when an image displayed in the display region 222 is changed in the vertical direction 224, the imaging direction of the imaging apparatus 110 is changed in a vertical direction 214. Furthermore, for example, when an image displayed in the display region 222 is changed in the horizontal direction 223, the imaging direction of the imaging apparatus 110 is changed in a horizontal direction 213.

Furthermore, for example, the user positions the finger 227 on an image displayed in the display region 222 on the display screen and then performs an operation to rotate the image clockwise or counterclockwise in a rotation direction 225. In this way, the user can rotate a region displayed in the display region 222 in the region of a panoramic image. The terminal apparatus 120 may be configured to allow the user to use a plurality of fingers to rotate the image displayed in the display region 222 on the display screen.

Furthermore, for example, the user positions the finger 227 on an image displayed in the second display region on the display screen and then performs a pinch-in or pinch-out operation. In this way, the user can reduce or enlarge a region displayed in the second display region in the region of a panoramic image.

Here, the pinch-in operation is an operation to shorten the distance between the first finger and the second finger while keeping the first finger and the second finger in contact with or in vicinity to the operation screen. Furthermore, the pinch-out is an operation to lengthen the distance between the first finger and the second finger while keeping the first finger and the second finger in contact with or in vicinity to the operation screen. The pinch-in or pinch-out operation may be performed using operation tools, such as touch pens, instead of fingers.

Rotating an image displayed in the display region 222 results in a rotation of an image displayed within the frame 226. According to this rotation, the imaging range of the imaging apparatus 110 is rotated. For example, when an image displayed in the display region 222 is rotated in the rotation direction 225, the imaging direction of the imaging apparatus 110 is rotated in a rotation direction 215.

The user performs an operation to change the range of an image displayed in the display region 222 (the first region) in such a manner that an image within a range corresponding to a range within which to cause the imaging apparatus 110 to capture an image is displayed in a region (the second region) indicated by the frame 226.

Here, the input unit 126 included in the terminal apparatus 120 is able to receive an operation on a region that does not contain the second region (the region indicated by the frame 226) in the first region (the display region 222). Accordingly, the user can perform an operation on even a region that does not contain the region indicated by the frame 222 in the display region 222, so as to change a range to be displayed in a region within the frame 226. The range to be displayed in the region within the frame 226 is a range corresponding to the imaging range within which to cause the imaging apparatus 110 to capture an image.

The user is allowed to perform an operation on the display region 222, which is larger than the region within the frame 226, to change a region to be displayed in the frame 226, thus changing the imaging range of the imaging apparatus 110.

In this way, the user can readily specify a desired range in a range within which the imaging apparatus 110 is able to capture an image. Here, the desired range is a range corresponding to an imaging range which the user specifies with respect to the imaging apparatus 110.

Accordingly, the user can change the imaging range of the imaging apparatus 110 more readily than a case where the user changes the size or position of a frame on a panoramic image displayed on the display screen so as to change the imaging range of the imaging apparatus 110.

The terminal apparatus 120 transmits, to the imaging apparatus 110, an operation instruction to drive the imaging apparatus 110 in such a manner that the region of an object corresponding to an image displayed in the frame 226 becomes coincident with the imaging range of the imaging apparatus 110.

In the present exemplary embodiment, an example is described in which the range of the whole panoramic image corresponds to a range within which the imaging apparatus 110 is able to capture an image while changing the imaging direction and the angle of field. The terminal apparatus 120 outputs, to the imaging apparatus 110, an instruction to change the imaging range of the imaging apparatus 110 in such a manner that the correspondence relationship between the range of the whole panoramic image and the range of the frame 226 corresponds to the correspondence relationship between the imaging available range of the imaging apparatus 110 and the imaging range of the imaging apparatus 110.

Thus, the terminal apparatus 120 changes the imaging range of the imaging apparatus 110 in such a manner that the relative position of the second region (the region indicated by the frame 226) in a region within which the imaging apparatus 110 is able to capture an image while changing the imaging range corresponds to the relative position of the imaging range of the imaging apparatus 110 in the region within which the imaging apparatus 110 is able to capture an image while changing the imaging range.

Furthermore, the terminal apparatus 120 changes the angle of field of the imaging apparatus 110 in such a manner that the size of a range displayed in the second region with respect to the region within which the imaging apparatus 110 is able to capture an image while changing the imaging range corresponds to the size of the imaging range of the imaging apparatus 110 with respect to the region within which the imaging apparatus 110 is able to capture an image while changing the imaging range.

In the present exemplary embodiment, an example in which the user operates the terminal apparatus 120 to pan the imaging direction of the imaging apparatus 110 to the right is described with reference to FIGS. 3A and 3B. In the example illustrated in FIGS. 3A and 3B, the terminal apparatus 120 performs communication with the imaging apparatus 110 via the wireless LAN 230.

Figure 3A:
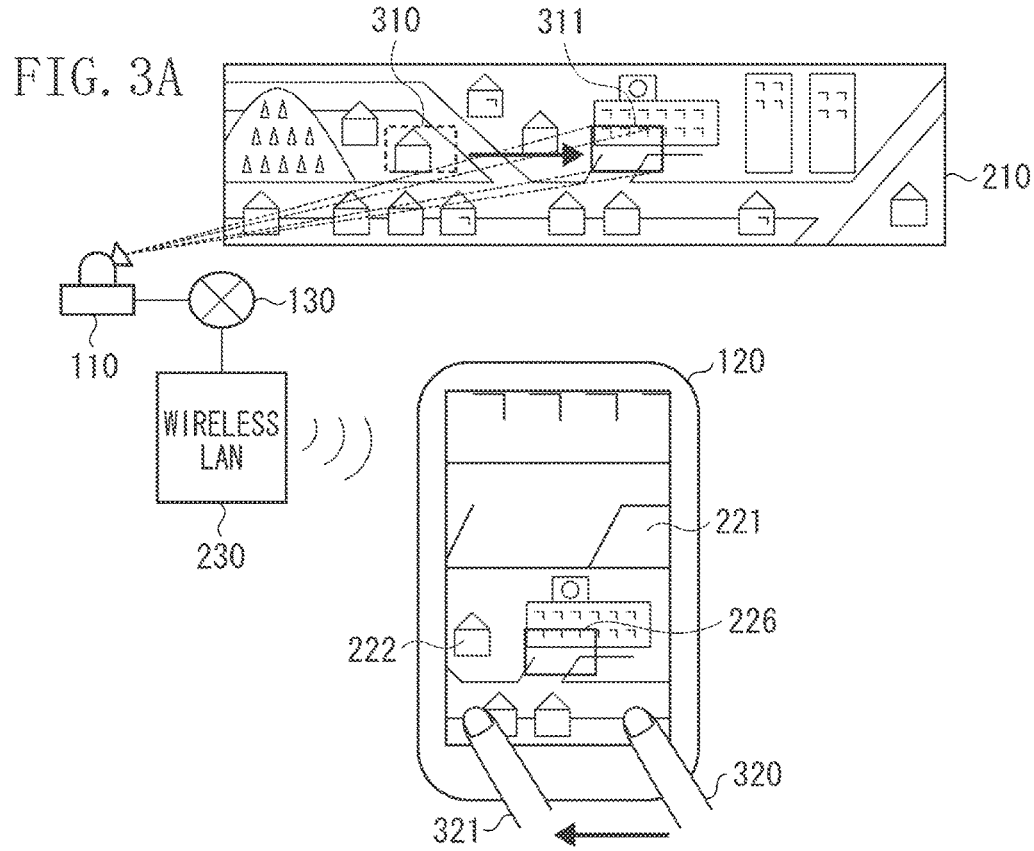
FIGS. 3A and 3B illustrate examples of changes of the imaging direction of the imaging apparatus occurring according to operations of a terminal apparatus.
Figure 3B:
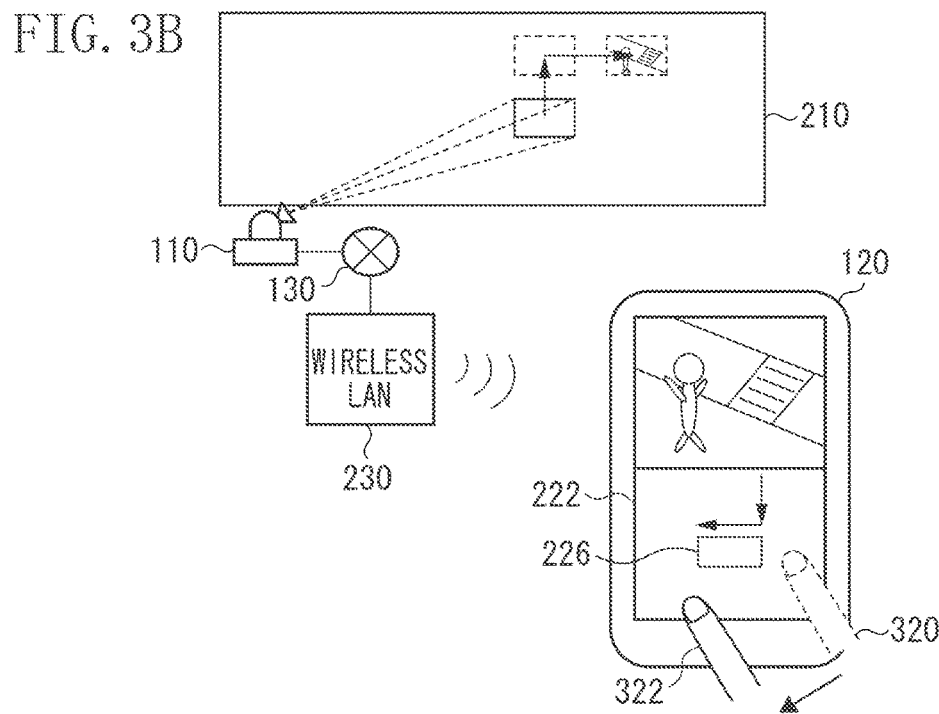

When intending to pan the imaging direction of the imaging apparatus 110 to the right, the user performs an operation of swiping on the screen with a finger to the left from a position 320 to a position 321 while keeping the finger in contact with or in vicinity to the display region 222, as illustrated in FIG. 3A. According to such a swiping operation of the user, the image displayed in the display region 222 changes from an image located in a first position on the panoramic image to an image located in a second position nearer the right than the first position on the panoramic image. In this way, the user can move a pointer (for example, the finger of the user) from the first position to the second position on the display screen of the display unit 125, thus inputting an instruction to change display of the image.

Furthermore, the position 320, with which the user brings the finger into contact to start panning the imaging direction, may be a region other than the frame 226 in the display region 222. The terminal apparatus 120 may be configured to, if the finger comes into contact with the frame 226, move the position of the frame 226 without moving a panoramic image displayed in the display region 222.

In the example illustrated in FIG. 3A, the swiping operation causes an image displayed in the frame 226 to change from a state in which an image corresponding to an imaging range indicated by a frame 310 is displayed to a state in which an image corresponding to an imaging range indicated by a frame 311 is displayed.

Consequently, the terminal apparatus 120 transmits, to the imaging apparatus 110, an instruction to move the imaging range of the imaging apparatus 110 from the range indicated by the frame 310 to the range indicated by the frame 311, as illustrated in FIG. 3A. If the user moves the frame 226, the terminal apparatus 120 instructs the imaging apparatus 110 to capture an image within a range indicated by the frame 226 after being moved.

In this way, the imaging apparatus 110 is controlled to pan to the right in such a manner that the imaging range changes from the range indicated by the frame 310 to the range indicated by the frame 311.

In the present exemplary embodiment, when the swiping operation of the user is input, the display unit 125 changes display of an image in the display region 222 at a speed corresponding to the speed at which the imaging apparatus 110 changes the imaging range. The determination unit 122 specifies the speed at which the imaging apparatus 110 changes the imaging range, based on information acquired by the communication unit 121. For example, the determination unit 122 specifies a first speed at which the imaging apparatus 110 changes the imaging range, according to the speed at which the pointer has moved from the first position to the second position on the display screen.

If the first speed specified by the determination unit 122 is equal to or lower than a second speed corresponding to the information acquired by the communication unit 121, the control unit 123 changes an image displayed in the display region 222 at a speed corresponding to the first speed. In other words, if the user has moved the finger at a speed corresponding to a speed equal to or lower than the upper limit of speeds at which the imaging apparatus 110 is able to change the imaging range, the control unit 123 controls the display unit 125 to set the speed at which an image displayed in the display region 222 changes to a speed corresponding to the user operation. In the present exemplary embodiment, the upper limit of speeds at which the imaging apparatus 110 is able to change the imaging range corresponds to the second speed. Furthermore, in the present exemplary embodiment, the speed at which the user has moved the finger on the display region 222 corresponds to the first speed.

On the other hand, if the first speed is higher than the second speed, the control unit 123 changes an image displayed in the display region 222 at a speed corresponding to the second speed. In other words, if the user has moved the finger at a speed corresponding to a speed higher than the upper limit of speeds at which the imaging apparatus 110 is able to change the imaging range, the control unit 123 controls the display unit 125 to limit the speed at which an image displayed in the display region 222 changes. For example, the control unit 123 changes an image in the display region 222 at a speed lower than the speed of change of the image corresponding to the speed at which the user has moved the finger.

In this way, even if the user has input an instruction to change the imaging range at a speed exceeding the upper limit of speeds at which the imaging apparatus 110 is able to change the imaging range, an operation UI can be changed at the speed at which the imaging apparatus 110 actually changes the imaging range. Here, the term "operation UI" means a display image which the user uses to input an instruction to change the imaging range of the imaging apparatus 110.

The user operation is not limited to a swiping operation. For example, the user operation can be a touch operation, such as tap, swipe, flick, pinch-in, and pinch-out. Alternatively, the user can input an operation using a mouse or a keyboard connected to the terminal apparatus 120.

Next, an example in which the user operates the terminal apparatus 120 to tilt the imaging direction of the imaging apparatus 110 upward is described.

When intending to tilt the imaging direction of the imaging apparatus 110 upward, the user performs an operation of swiping on the screen with a finger from a third position on the display region 222 to a fourth position located below the third position while keeping the finger in contact with or in vicinity to the display region 222. According to such a swiping operation of the user, the position of an image displayed in the display region 222 on the panoramic image moves downward. In this way, an image displayed in the frame 226 is changed, and the imaging direction of the imaging apparatus 110 is controlled to be tilted upward. Even in the case of a tilting operation, similar to the case of a panning operation, the display unit 125 changes display of an image in the display region 222 at a speed corresponding to the speed at which the imaging apparatus 110 changes the imaging range.

Next, an example operation in which the user performs an operation of swiping on the screen with a finger diagonally downward left from a position 320 to a position 322 is described with reference to FIG. 3B. As the user has performed the swiping operation diagonally downward left, the terminal apparatus 120 transmits, to the imaging apparatus 110, an instruction to move the imaging direction of the imaging apparatus 110 diagonally upward right. When receiving the instruction for moving diagonally upward right, the imaging apparatus 110 first performs a tilting operation upward, and then performs a panning operation to the right. As a result, the imaging direction of the imaging apparatus 110 is moved diagonally upward right. Alternatively, when receiving the instruction for moving diagonally upward right, the imaging apparatus 110 may be configured to first perform a panning operation to the right, and then to perform a tilting operation upward.

In the present exemplary embodiment, when the user has performed an operation of swiping in the display region 222 on the screen with the finger diagonally downward left, an image displayed in the display region 222 changes according to the actual direction in which the imaging apparatus 110 changes the imaging direction. For example, when the imaging apparatus 110 performs a tilting operation upward and then performs a panning operation to the right according to the user operation, an image displayed in the display region 222 changes in such a manner as to move downward in the tilting direction and then move to the left in the panning direction.

In this way, when the finger of the user has linearly moved from a fifth position on the display region 222 to a sixth position located diagonally left below the fifth position, an image displayed in the display region 222 changes as follows: An image displayed at the fifth position on the display region 222 moves to the sixth position after passing a seventh position that is not located on a line segment connecting the fifth position and the sixth position by a straight line.

The direction in which to change an image in the display region 222 is determined by the control unit 123 based on the second information, which is acquired by the communication unit 121, indicating directions in which the imaging apparatus 110 is able to change the imaging direction.

If an instruction is issued by the user to move an image displayed at the fifth position in the display region 222 to the sixth position, the determination unit 122 specifies, based on the second information, a path along which the imaging apparatus 110 changes the imaging direction. Thus, the determination unit 122 specifies a first path along which to change the imaging range according to the path along which the pointer has moved from the fifth position to the sixth position. In a case where there is a plurality of paths along which the imaging apparatus 110 moves the imaging direction from a position corresponding to the fifth position to a position corresponding to the sixth position, the determination unit 122 specifies the first path according to a predetermined determination criterion. For example, the determination unit 122 selects a path according to which the amount of driving of the imaging apparatus 110 is minimized. The determination criterion used for the control unit 123 to determine the path can be previously acquired by the communication unit 121 from the imaging apparatus 110. Alternatively, the determination criterion may be acquired from an apparatus that is other than the imaging apparatus 110 and that is connected to the network 130.

When the determination unit 122 has specified a path along which the imaging apparatus 110 changes the imaging direction, the control unit 123 controls the display unit 125 according to the specified path such that an image in the frame 226 changes, thus changing an image in the display region 222.

If the first path specified by the determination unit 122 corresponds to a direction indicated by the second information acquired by the communication unit 121, the control unit 123 changes an image displayed in the display region 222 in the direction corresponding to the first path. Here, the second information is information that is acquired by the communication unit 121 and that indicates directions in which the imaging apparatus 110 is able to change the imaging direction. Thus, when the user has moved the finger along a path corresponding to the direction in which the imaging apparatus 110 is able to change the imaging range, the control unit 123 controls the display unit 125 to set a direction in which an image displayed in the display region 222 changes to a direction corresponding to the user operation. The directions in which the imaging apparatus 110 is able to change the imaging range include, for example, panning directions, tilting directions, and rotation directions. Furthermore, the directions in which the imaging apparatus 110 is not able to change the imaging range include, for example, directions other than the panning directions, the tilting directions, and the rotation directions.

On the other hand, if the first path does not correspond to the direction indicated by the second information, the control unit 123 causes an image displayed in the display region 222 to change in the direction indicated by the second information. In other words, if the user has moved the finger in a direction that does not correspond to the directions in which the imaging apparatus 110 is able to change the imaging range (for example, in an oblique direction), the control unit 123 controls the display unit 125 to restrict the direction in which an image displayed in the display region 222 changes. For example, the control unit 123 causes an image displayed in the display region 222 to change in a direction corresponding to the path along which the imaging apparatus 110 is able to change the imaging range.

In this way, in the present exemplary embodiment, when a swiping operation is input by the user, the display unit 125 changes display of an image in the display region 222 according to the direction in which the imaging apparatus 110 changes the imaging direction. The direction in which the imaging apparatus 110 changes the imaging direction is specified by the control unit 123 based on the information acquired by the communication unit 121. However, the user operation is not limited to a swiping operation. For example, the user operation may be a touch operation, such as tap, swipe, flick, pinch-in, and pinch-out. Alternatively, the user may input an operation using a mouse or a keyboard connected to the terminal apparatus 120.

Next, an example in which zoom control is performed on the imaging apparatus 110 is described.

As the user performs a pinch-out operation in such a way as to enlarge a panoramic image displayed in the display region 222, an image displayed in the frame 226 is enlarged. As the image displayed in the frame 226 is enlarged, the imaging range of the imaging apparatus 110 is controlled to be zoomed toward the telephoto side.

Next, an example in which the terminal apparatus 120 is operated to rotate the imaging unit 111 of the imaging apparatus 110 around the optical axis thereof is described.

When the user performs an operation on the terminal apparatus 120 in such a way as to rotate a panoramic image displayed in the display region 222, an image displayed in the frame 226 is rotated. As the image displayed in the frame 226 is rotated, the imaging unit 111 of the imaging apparatus 110 is rotated around the optical axis thereof. For example, when the imaging unit 111 has been rotated 180 degrees, a first image captured by the imaging unit 111 corresponds to an image obtained by rotating a second image, captured before the imaging unit 111 is rotated, 180 degrees. Thus, the first image and the second image are inverse relative to each other in right, left, up, and down.

Even in the case of a zoom operation and a rotation operation, similar to the case of a panning operation, the display unit 125 changes display of an image in the display region 222 at a speed corresponding to the speed at which the imaging apparatus 110 changes the imaging range.

The above-described operation examples are merely examples and are not intended to be restrictive. For example, if an input exceeding the speed or acceleration at which the imaging apparatus 110 is able to operate is received from the user, the terminal apparatus 120 may be configured not to accept such a user input. Furthermore, the operation for changing the position, on a panoramic image, of the range of an image displayed in the display region 222 is not limited to touch operations. For example, the user may operate a mouse connected to the terminal apparatus 120 to move a cursor displayed on the display screen and to drag and drop an image, thus moving the image.

Alternatively, the user may operate a keyboard connected to the terminal apparatus 120 to change an image displayed in the display region 222.

Furthermore, the display unit 125 may be configured to display, on the display screen, buttons used to issue instructions to move, enlarge, and reduce a region on a panoramic image displayed in the display region 222, thus allowing the user to operate the buttons. Alternatively, the display unit 125 may be configured to display a slide bar along with an image in the display region 222, thus allowing the user to issue instructions to move, enlarge, and reduce a region on a panoramic image displayed in the display region 222.

Moreover, the communication unit 121 can transmit, to the imaging apparatus 110, an instruction to change the imaging range of the imaging apparatus 110, at an interval corresponding to the acceleration at which a pointer (for example, the finger of the user or a mouse pointer) has moved on the display screen.

Next, an operation of the terminal apparatus 120 is described with reference to FIG. 4. In the case of a structure in which the control unit 123 of the terminal apparatus 120 contains a processor and a memory, the processing illustrated in FIG. 4 is implemented by the control unit 123 executing the procedure illustrated in FIG. 4 after loading a program stored in the storage unit 124 into the memory. Alternatively, the hardware of the terminal apparatus 120 may execute a part or the whole of the processing illustrated in FIG. 4.

In step S401, the control unit 123 receives a user operation input to the input unit 126. In a case where the user operation is performed with a touch operation, for example, the user can start an operation by bringing the finger in contact with or in vicinity to an image displayed by the display unit 125. Alternatively, the user can start an operation by dragging an image displayed by the display unit 125. Furthermore, in a case where the user operation is performed via buttons or a scroll bar displayed by the display unit 125, the user can start an operation by clicking the buttons or starting moving the scroll bar.

Here, the drag operation is an operation for moving a cursor on the display screen by moving a mouse while holding down a mouse button.

In step S402, the control unit 123 acquires a movement direction in which an image displayed in the frame 226 has moved in the panoramic image due to the user operation. As described above, as the user operates a region (for example, a region outside the frame 226) in the display region 222, a region, within the range 210, corresponding to the display region 222 is changed. The range 210 is an imaging available range within which the imaging apparatus 110 is able to capture an image while changing the imaging range. According to such a change, a region, within the range 210, corresponding to the frame 226 is also changed. The control unit 123 instructs the imaging apparatus 110 to capture an image within the region, within the range 210, corresponding to the frame 226.

In step S403, the control unit 123 acquires a movement amount by which a region displayed in the frame 226 has moved in the panoramic image due to the user operation. The movement amount of the region in the frame 226 can be, for example, a distance by which the center of the region displayed in the frame 226 has moved in the panoramic image.

In step S404, the control unit 123 acquires a movement speed at which the region displayed in the frame 226 has moved in the panoramic image due to the user operation. The movement speed of the region in the frame 226 can be, for example, a speed at which the center of the region displayed in the frame 226 has moved in the panoramic image.

In step S405, the control unit 123 acquires the amount by which the size of the region displayed in the frame 226 has changed in the panoramic image due to the user operation.

In step S406, the control unit 123 acquires the speed at which the size of the region displayed in the frame 226 has changed in the panoramic image due to the user operation.

In step S407, the control unit 123 controls the determination unit 122 to determine a direction in which to change the imaging direction of the imaging apparatus 110, according to the movement direction acquired in step S402. Here, the control unit 123 specifies a direction in which to change the imaging direction of the imaging apparatus 110, based on the second information, acquired by the communication unit 121, indicating directions in which the imaging apparatus 110 is able to change the imaging direction.

In step S408, the control unit 123 controls the determination unit 122 to determine the amount of change by which to change the imaging direction of the imaging apparatus 110 from the current imaging direction, according to the movement amount acquired in step S403.

In step S409, the control unit 123 controls the determination unit 122 to determine a speed at which to change the imaging direction of the imaging apparatus 110, according to the movement speed acquired in step S404. For example, if the speed of change of the imaging direction corresponding to the movement speed acquired in step S404 is equal to or lower than the maximum speed at which the imaging apparatus 110 is able to change the imaging direction, the control unit 123 determines to cause the imaging apparatus 110 to change the imaging direction at the speed of change corresponding to the acquired movement speed. On the other hand, if the speed of change of the imaging direction corresponding to the movement speed acquired in step S404 is higher than the maximum speed at which the imaging apparatus 110 is able to change the imaging direction, the control unit 123 determines to cause the imaging apparatus 110 to change the imaging direction at a predetermined speed. The predetermined speed can be, for example, the upper limit of speeds at which the imaging apparatus 110 is able to change the imaging direction.

Here, an example of the speed of change of the imaging direction corresponding to the movement speed acquired in step S404 is described. For example, suppose that the user moves the finger from an eighth position to a ninth position on the display region 222 of the terminal apparatus 120. Suppose that an image displayed in the frame 226 when the finger is located at the eighth position on the display region 222 is referred to as a "third image". Furthermore, suppose that an image displayed in the frame 226 when the finger is located at the ninth position on the display region 222 is referred to as a "fourth image".

The movement speed acquired in step S404 is, for example, a quotient obtained by dividing a first movement distance from the third image to the fourth image on the range 210 (a panoramic image) by a first period of time for which the user has moved the finger from the eighth position to the ninth position.

Furthermore, the speed of change of the imaging direction corresponding to the movement speed is a speed required to change the imaging direction from a first imaging direction to a second imaging direction for the first period of time. The first imaging direction is an imaging direction used for the imaging apparatus 110 to capture an image at a position corresponding to the third image. Furthermore, the second imaging direction is an imaging direction used for the imaging apparatus 110 to capture an image at a position corresponding to the fourth image.

In other words, the speed of change of the imaging direction corresponding to the movement speed is a quotient obtained by dividing the distance required for the imaging apparatus 110 to change the imaging direction from the first imaging direction to the second imaging direction by the first period of time. The above-described method for determining the speed of change of the imaging direction is merely an example and is not intended to be restrictive.

Furthermore, the imaging apparatus 110 may be configured to determine the speed of change. The terminal apparatus 120 may transmit, to the imaging apparatus 110, information about a speed corresponding to the user operation, and the imaging apparatus 110 may determine the speed of change of the imaging range.

In step S410, the control unit 123 determines the amount by which to change the angle of field of the imaging apparatus 110 by changing a zoom ratio, according to the amount of change acquired in step S405.

In step S411, the control unit 123 determines a speed at which to change the angle of field of the imaging apparatus 110, based on the speed of change acquired in step S406. For example, if the speed of change of the imaging direction corresponding to the speed of change acquired in step S406 is equal to or lower than the maximum speed at which the imaging apparatus 110 is able to change the angle of field, the control unit 123 determines to cause the imaging apparatus 110 to change the angle of field at the speed of change corresponding to the acquired speed of change. On the other hand, if the speed of change of the imaging direction corresponding to the speed of change acquired in step S406 is higher than the maximum speed at which the imaging apparatus 110 is able to change the angle of field, the control unit 123 determines to cause the imaging apparatus 110 to change the angle of field at a predetermined speed. The predetermined speed can be, for example, the upper limit of speeds at which the imaging apparatus 110 is able to change the angle of field.

Here, an example of the speed of change of the angle of field corresponding to the speed of change acquired in step S406 is described. For example, suppose that the user performs a pinch-out operation on the display region 222 of the terminal apparatus 120. Suppose that an image displayed in the frame 226 before the user performs the pinch-out operation is referred to as a "fifth image". Furthermore, suppose that an image displayed in the frame 226 after the user performs the pinch-out operation is referred to as a "sixth image". The speed of change acquired in step S406 is, for example, a quotient obtained by dividing the ratio of the area of the sixth image to the area of the fifth image in the range 210 (for example, a panoramic image) by a second period of time required from the start to the end of the pinch-out operation by the user.

Furthermore, the speed of change of the angle of field corresponding to the acquired speed of change is a speed required for the imaging apparatus 110 to change the angle of field from a first angle of field used to capture an image within a range corresponding to the fifth image to a second angle of field used to capture an image within a range corresponding to the sixth image for the second period of time. The above-described method for determining the speed of change of the angle of field is merely an example and is not intended to be restrictive.

Furthermore, the imaging apparatus 110 may be configured to determine the speed of change of the angle of field. The terminal apparatus 120 may transmit, to the imaging apparatus 110, information about a speed corresponding to the user operation, and the imaging apparatus 110 may determine the speed of change of the angle of field.

In step S412, the control unit 123 controls the communication unit 121 to output, to the imaging apparatus 110, an operation instruction to change the imaging range of the imaging apparatus 110.

The operation instruction output to the imaging apparatus 110 includes an instruction for the movement direction for changing the imaging direction of the imaging apparatus 110, which corresponds to the content determined in step S407.

Furthermore, the operation instruction output to the imaging apparatus 110 includes an instruction for the amount of change of the imaging direction of the imaging apparatus 110, which corresponds to the content determined in step S408.

Moreover, the operation instruction output to the imaging apparatus 110 includes an instruction for the speed of change of the imaging direction of the imaging apparatus 110, which corresponds to the content determined in step S409.

Additionally, the operation instruction output to the imaging apparatus 110 includes an instruction for the amount of change of the angle of field of the imaging apparatus 110, which corresponds to the content determined in step S410.

Furthermore, the operation instruction output to the imaging apparatus 110 includes an instruction for the speed of change of the angle of field of the imaging apparatus 110, which corresponds to the content determined in step S411.

The operation instruction output to the imaging apparatus 110 may be set to include any one information of the speed of change of the imaging direction and the speed of change of the angle of field.

In step S413, the control unit 123 determines whether the user operation has been stopped. With regard to the stop of the user operation, for example, in a case where the user operation is performed with a touch operation, the control unit 123 can determine that the user operation has been stopped when the finger of the user has moved away from the display screen. Alternatively, in a case where the user operation is performed with an operation on a cursor displayed on the display screen, the control unit 123 can determine that the user operation has been stopped, for example, when an image displayed by the display unit 125 has been dropped after being dragged. Furthermore, in a case where the user operation is performed via buttons or a scroll bar displayed by the display unit 125, the control unit 123 can determine that the user operation has been stopped when clicking of the buttons has been completed or when the movement of the scroll bar has been stopped. Here, the dropping operation is an operation to release the mouse button after continuing the dragging operation.

If it is determined that the user operation is continuing (NO in step S413), the control unit 123 repeats operations in steps S401 to S413.

On the other hand, if it is determined that the user operation has been stopped (YES in step S413), the control unit 123 ends the processing for controlling the imaging range of the imaging apparatus 110. Furthermore, the control unit 123 may be configured to transmit the operation instruction to the imaging apparatus 110 after determining that the user has stopped the operation. In other words, the control unit 123 may be configured to transmit the operation instruction to the imaging apparatus 110 after the user performs an operation on the display region 222 and competes specifying and changing the imaging range.

In the above-described way, the terminal apparatus 120 is able to change the imaging range of the imaging apparatus 110 such that a range corresponding to an image displayed in the frame 226 becomes coincident with the imaging range of the imaging apparatus 100.

Furthermore, according to the present exemplary embodiment, the user can change the imaging range of the imaging apparatus 110 without changing the position or size of the frame 226 displayed in the display region 222.

The user can change the imaging range of the imaging apparatus 110 by performing an operation on a panoramic image displayed in the display region 222, which is displayed larger than the frame 226 corresponding to the imaging range.

In this way, according to the present exemplary embodiment, the user can readily specify a desired position on a panoramic image. Accordingly, the user can use the terminal apparatus 120 to readily change the imaging range of the imaging apparatus 110.

Figure 6:
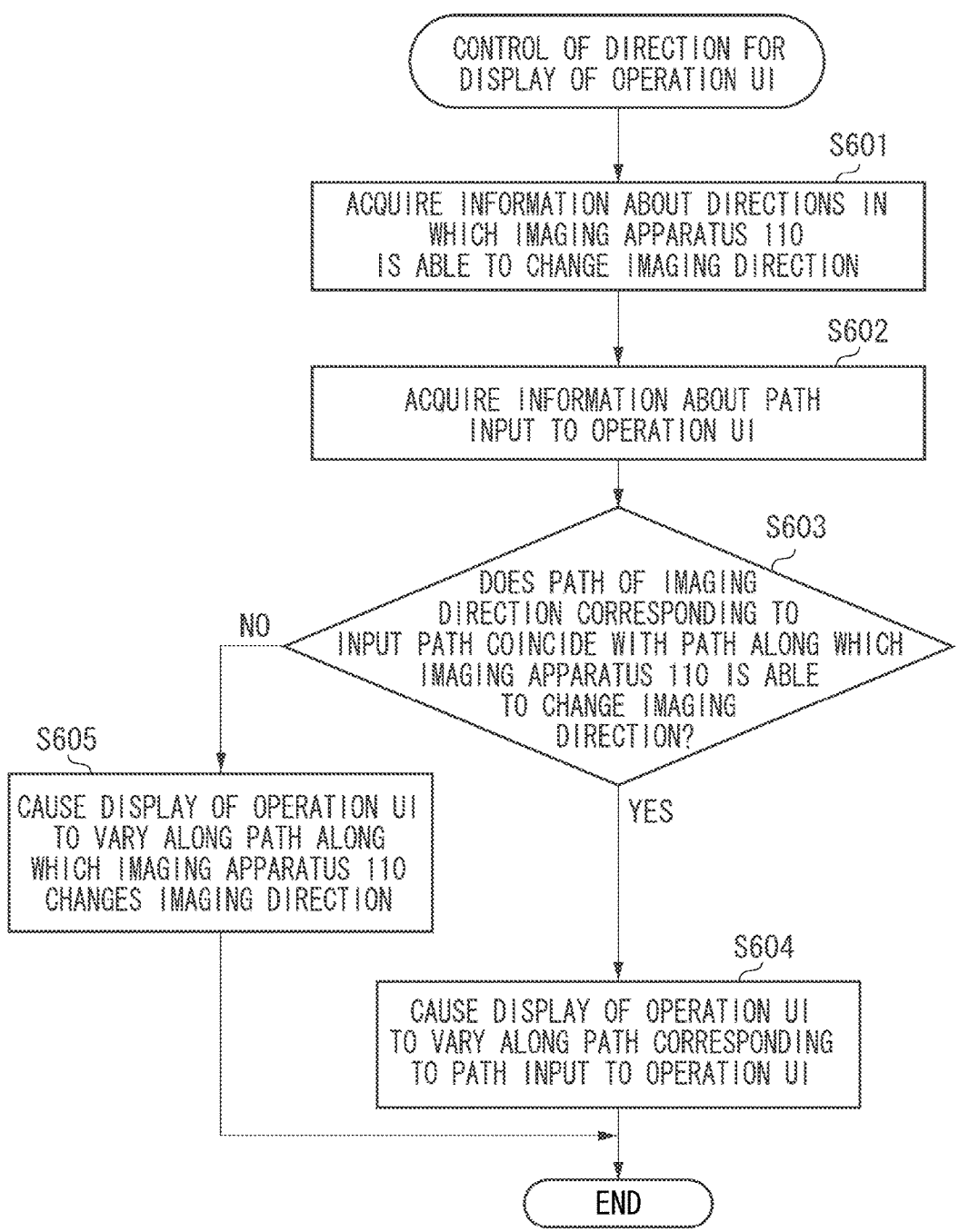
FIG. 6 is a flowchart illustrating control of a direction in which to change display of the operation UI.

Next, display processing for an operation UI of the terminal apparatus 120 is described with reference to FIGS. 5 and 6. In the case of a structure in which the control unit 123 of the terminal apparatus 120 contains a processor and a memory, the processing illustrated in FIGS. 5 and 6 is implemented by the control unit 123 executing the procedure illustrated in FIGS. 5 and 6 after loading a program stored in the storage unit 124 into the memory. Alternatively, the hardware of the terminal apparatus 120 may execute a part or the whole of the processing illustrated in FIGS. 5 and 6.

First, control of the speed for display of an operation UI is described with reference to FIG. 5.

In step S501, the control unit 123 acquires, via the communication unit 121, information about speeds at which the imaging apparatus 110 is able to change the imaging range. The speeds at which the imaging apparatus 110 is able to change the imaging range include, for example, speeds at which the imaging apparatus 110 is able to change the imaging direction in panning directions or speeds at which the imaging apparatus 110 is able to change the imaging direction in tilting directions. Furthermore, the speeds at which the imaging apparatus 110 is able to change the imaging range include, for example, speeds at which the imaging apparatus 110 is able to change the angle of view. For example, when being connected to the imaging apparatus 110 via the network 130, the terminal apparatus 120 can acquire the information about speeds at which the imaging apparatus 110 is able to change the imaging range. Furthermore, for example, when displaying a UI used to change the imaging range of the imaging apparatus 110, the terminal apparatus 120 can acquire the information about speeds at which the imaging apparatus 110 is able to change the imaging range. Alternatively, in response to an instruction from the user, the terminal apparatus 120 may request the imaging apparatus 110 to transmit the information to the terminal apparatus 120. These are not restrictive, and the timing for acquiring information about speeds at which the imaging apparatus 110 is able to change the imaging range is not specifically restricted.

Next, in step S502, the control unit 123 acquires the speed of change of the imaging range corresponding to the speed of operation of the operation UI by the user. The speed of operation of the operation UI by the user can be, for example, a speed at which the user moves the finger on the display region 222. Furthermore, the speed of operation of the operation UI by the user can be, for example, a speed of operation input via a mouse or keyboard connected to the terminal apparatus 120, besides the speed of a touch operation. As described above, the determination unit 122 specifies the speed of change of the imaging range corresponding to the speed of operation of the operation UI. The control unit 123 acquires information about the speed of change specified by the determination unit 122.

Next, in step S503, the control unit 123 determines whether the speed of change of the imaging range corresponding to the speed of operation of the operation UI is equal to or lower than the maximum speed at which the imaging apparatus 110 is able to change the imaging range.

If the speed of change of the imaging range corresponding to the speed of operation of the operation UI is equal to or lower than the maximum speed at which the imaging apparatus 110 is able to change the imaging range (YES in step S503), then in step S504, the control unit 123 causes display of the operation UI to vary at a speed corresponding to the speed of operation of the operation UI. The speed at which display of the operation UI varies can be, for example, a speed at which an image displayed in the frame 126 varies. In other words, the speed at which display of the operation UI varies can be a speed at which a region displayed in the frame 226 moves on a panoramic image. The speed at which a region displayed in the frame 226 moves can be, for example, a speed at which the center of the region displayed in the frame 226 moves on a panoramic image.

On the other hand, if the speed of change of the imaging range corresponding to the speed of operation of the operation UI exceeds the maximum speed at which the imaging apparatus 110 is able to change the imaging range (NO in step S503), then in step S505, the control unit 123 causes display of the operation UI to vary at a predetermined speed. The predetermined speed can be, for example, a speed corresponding to the upper limit of speeds at which the imaging apparatus 110 is able to change the imaging direction. In this way, in a case where the terminal apparatus 120 receives an instruction to change display of the operation UI at a speed exceeding the maximum speed at which the imaging apparatus 110 is able to change the imaging range, the control unit 123 can cause display of the operation UI to vary at a speed corresponding to the upper limit of speeds at which the imaging apparatus 110 is able to change the imaging range.

Alternatively, in step S505, the control unit 123 may keep display of the operation UI unvaried. In this way, in a case where the terminal apparatus 120 receives an instruction to change display of the operation UI at a speed exceeding the maximum speed at which the imaging apparatus 110 is able to change the imaging range, the control unit 123 can keep display of the operation UI unvaried, thus making the user operation ineffective.

In the above-described way, the user operation and the actual change of the imaging range of the imaging apparatus can be caused to correspond to each other.

Next, control of display regarding a change of the imaging direction in the operation UI is described with reference to FIG. 6.

In step S601, the control unit 123 acquires, via the communication unit 121, information about directions in which the imaging apparatus 110 is able to change the imaging direction. The information indicating directions in which the imaging apparatus 110 is able to change the imaging direction can be, for example, information indicating that the imaging apparatus 110 is able to change the imaging direction in panning directions and tilting directions. Alternatively, the information indicating directions in which the imaging apparatus 110 is able to change the imaging direction can be, for example, information indicating that the imaging apparatus 110 is able to change the imaging direction only in panning directions or only in tilting directions.

For example, when being connected to the imaging apparatus 110 via the network 130, the terminal apparatus 120 can acquire the information about directions in which the imaging apparatus 110 is able to change the imaging range. Furthermore, for example, when displaying a UI used to change the imaging range of the imaging apparatus 110, the terminal apparatus 120 can acquire the information about directions in which the imaging apparatus 110 is able to change the imaging range. Alternatively, in response to an instruction from the user, the terminal apparatus 120 may request the imaging apparatus 110 to transmit the information to the terminal apparatus 120. These are not restrictive, and the timing for acquiring information about directions in which the imaging apparatus 110 is able to change the imaging range is not specifically restricted.

Next, in step S602, the control unit 123 acquires information about a path of operation of the operation UI by the user. The path of operation of the operation UI by the user can be, for example, information indicating a path along which the user has moved the finger on the display region 222. Furthermore, the path of operation of the operation UI by the user can be, for example, information indicating a path of operation input via a mouse or keyboard connected to the terminal apparatus 120, besides the path of a touch operation.

Next, in step S603, the control unit 123 determines whether the path of the imaging direction corresponding to the path of operation of the operation UI coincides with a path along which the imaging apparatus 110 is able to change the imaging direction.

If the path of the imaging direction corresponding to the path of operation of the operation UI coincides with a path along which the imaging apparatus 110 is able to change the imaging direction (YES in step S603), then in step S604, the control unit 123 causes display of the operation UI to vary along the path corresponding to the path of operation of the operation UI. An example is described in which, as illustrated in FIG. 3A, the user inputs, to the operation UI, an instruction by moving the finger linearly to the left in a panning direction to move the imaging direction to the right in a panning direction. The imaging apparatus 110 is able to change the imaging direction linearly to the right in a panning direction. Furthermore, the imaging apparatus 110 is also able to change the imaging direction to the right in a panning direction with a single action. Since the path of operation by the user operation coincides with the path along which the imaging apparatus 110 is able to operate, the control unit 123 controls the display unit 125 to cause an image displayed in the display region 222 to vary along the path of operation by the user operation.

On the other hand, if the path of the imaging direction corresponding to the path of operation of the operation UI does not coincide with the path along which the imaging apparatus 110 is able to change the imaging direction (NO in step S603), then in step S605, the control unit 123 causes display of the operation UI to vary along the path along which the imaging apparatus 110 changes the imaging direction. An example is described in which, as illustrated in FIG. 3B, the user inputs, to the operation UI, an instruction by moving the finger linearly in the lower left direction to move the imaging direction in the upper right direction. The imaging apparatus 110 can change the imaging direction in panning directions and tilting directions. However, the imaging apparatus 110 is not able to move linearly in the upper right direction with a single action. As illustrated in FIG. 3B, to move the imaging direction in the upper right direction, the imaging apparatus 110 performs a tilting action upward and then performs a panning action to the right. Thus, a plurality of actions would be necessary. In this case, the path of operation by the user operation and the path along which the imaging apparatus 110 is able to operate do not coincide with each other. Therefore, the control unit 123 controls the display unit 125 to cause an image displayed in the display region 222 to vary along the path along which the imaging apparatus 110 changes the imaging direction.

Alternatively, in step S605, the control unit 123 may keep display of the operation UI unvaried. In this way, in a case where the terminal apparatus 120 receives an instruction to change the imaging direction along a path along which the imaging apparatus 110 is not able to change the imaging direction with a single action, the control unit 123 can keep display of the operation UI unvaried, thus making the user operation ineffective.

In the above-described way, the user operation and the change of the path of the imaging direction of the imaging apparatus can be caused to correspond to each other.

According to the above-described first exemplary embodiment, the user operation and the actual change of the imaging range of the imaging apparatus can be caused to correspond to each other.

Furthermore, according to the present exemplary embodiment, the speed at which or the path along which an operation UI displayed on the terminal apparatus 120 can be changed can be varied according to an ability which the imaging apparatus 110 connected to the terminal apparatus 120 has to change the imaging range. In other words, the speed at which or the path along which the operation UI can be changed can be made different between a case where a first imaging apparatus 110 is connected to the terminal apparatus 120 and a case where a second imaging apparatus 110 is connected to the terminal apparatus 120. Here, it is presumed that the first imaging apparatus 110 and the second imaging apparatus 110 differ in the speed at which or the path along which the first imaging apparatus 110 and the second imaging apparatus 110 are able to change the imaging range. In this way, the user can recognize an ability which the imaging apparatus 110 connected to the terminal apparatus 120 has to change the imaging range.

Furthermore, the communication unit 121 of the terminal apparatus 120 may be configured to acquire time information indicating a first period of time from a first point of time at which the input unit 126 has received a first instruction to a second of time at which the imaging apparatus starts an operation of changing the imaging range according to the first instruction. Then, the control unit 123 may be configured to vary display of an image on the display region 222 according to the first instruction after a time corresponding to the first period of time has elapsed from when the first instruction was received. For example, the timing at which the terminal apparatus 120 changes display of the operation UI may be made coincident with the timing at which the imaging apparatus 110 actually changes the imaging range. In this way, the user operation and the actual change of the imaging range of the imaging apparatus can be caused to correspond to each other.

While, in the first exemplary embodiment, an example of an operation UI is described in which the imaging direction of the imaging apparatus 110 can be changed by the user changing an image displayed in the display region 222 on the display screen of the terminal apparatus 120, the operation UI is not limited to such an example.

For example, in a second exemplary embodiment, the operation UI may be configured such that a scroll bar is displayed together with a captured image and the imaging direction of the imaging apparatus 110 can be changed according to an operation performed by the user on the scroll bar.

The configuration of an imaging system according to the second exemplary embodiment is similar to that in the first exemplary embodiment, and the description thereof is, therefore, not repeated.

An example of an operation UI displayed on the terminal apparatus 120 according to the second exemplary embodiment is described below with reference to FIG. 7.

A display region 700 is used to display an image captured by the imaging apparatus 110.

A scroll bar 701 is an operation UI used to change the imaging direction of the imaging apparatus 110 right and left in panning directions. The user can move the imaging direction of the imaging apparatus 110 right and left in panning directions by moving a knob 702 on the scroll bar 701 right and left.

A scroll bar 703 is an operation UI used to change the imaging direction of the imaging apparatus 110 up and down in tilting directions. The user can move the imaging direction of the imaging apparatus 110 up and down in tilting directions by moving a knob 704 on the scroll bar 703 up and down.

A scroll bar 705 is an operation UI used to change the angle of field of the imaging apparatus 110. The user can narrow the angle of field of the imaging apparatus 110 (increase the zoom ratio) by moving up a knob 706 on the scroll bar 705. The user can widen the angle of field of the imaging apparatus 110 (decrease the zoom ratio) by moving down the knob 706 on the scroll bar 705.

In such an example, the control unit 123 is able to limit a change of display of the knob 702 such that the speed at which the knob 702 can be moved on the scroll bar 701 corresponds to the speed at which the imaging apparatus 110 is able to change the imaging direction in panning directions. In other words, the control unit 123 is able to perform display control such that the speed at which the knob 702 can be moved on the scroll bar 701 does not exceed a speed corresponding to the speed at which the imaging apparatus 110 is able to change the imaging direction in panning directions.

Furthermore, the control unit 123 is able to limit a change of display of the knob 704 such that the speed at which the knob 704 can be moved on the scroll bar 703 corresponds to the speed at which the imaging apparatus 110 is able to change the imaging direction in tilting directions. In other words, the control unit 123 is able to perform display control such that the speed at which the knob 704 can be moved on the scroll bar 703 does not exceed a speed corresponding to the speed at which the imaging apparatus 110 is able to change the imaging direction in tilting directions.

Furthermore, the control unit 123 is able to limit a change of display of the knob 706 such that the speed at which the knob 706 can be moved on the scroll bar 705 corresponds to the speed at which the imaging apparatus 110 is able to change the angle of field. In other words, the control unit 123 is able to perform display control such that the speed at which the knob 706 can be moved on the scroll bar 705 does not exceed a speed corresponding to the speed at which the imaging apparatus 110 is able to change the angle of field.

Other operations of the imaging system according to the second exemplary embodiment are similar to those described in the first exemplary embodiment, and the description thereof is, therefore, not repeated.

The example of the operation UI illustrated in FIG. 7 is merely an example, and may be configured in various manners. According to the above-described second exemplary embodiment, the user operation and the actual change of the imaging range of the imaging apparatus can be caused to correspond to each other.

Furthermore, according to the present exemplary embodiment, the speed at which an operation UI displayed on the terminal apparatus 120 can be changed can be varied according to an ability which the imaging apparatus 110 connected to the terminal apparatus 120 has to change the imaging range. In other words, the speed at which the operation UI can be changed can be made different between a case where a first imaging apparatus 110 is connected to the terminal apparatus 120 and a case where a second imaging apparatus 110 is connected to the terminal apparatus 120. Here, it is presumed that the first imaging apparatus 110 and the second imaging apparatus 110 differ in the speed at which the first imaging apparatus 110 and the second imaging apparatus 110 are able to change the imaging range. In this way, the user can recognize an ability which the imaging apparatus 110 connected to the terminal apparatus 120 has to change the imaging range.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-098991 filed May 12, 2014, which is hereby incorporated by reference herein in its entirety.

What is claimed is:

1. A control apparatus comprising:
an acquisition unit configured to acquire capability information regarding a speed at which an imaging apparatus changes an imaging range thereof;
a display control unit configured to, if an operation of moving an image for specifying the imaging range within which the imaging apparatus captures an image is executed, move the image based on the capability information acquired by the acquisition unit;
a transmission unit configured to transmit, to the imaging apparatus, an instruction for changing the imaging range according to the operation; and
a specifying unit configured to specify a speed at which the imaging apparatus changes the imaging range according to the operation,
wherein an input unit inputs a first instruction for changing display of the image by moving a pointer from a first position to a second position on a display screen of a display unit,
wherein the specifying unit specifies a first speed at which the imaging apparatus changes the imaging range according to a speed at which the pointer has moved from the first position to the second position, and
wherein the display control unit changes display of the image at a speed corresponding to the first speed specified by the specifying unit if the first speed is equal to or lower than a second speed corresponding to the capability information acquired by the acquisition unit, and changes display of the image at a speed corresponding to the second speed if the first speed is higher than the second speed.

2. The control apparatus according to claim 1, wherein the image is an image indicating an imaging position of the imaging apparatus.

3. The control apparatus according to claim 1, wherein if the operation of moving the image is executed by moving a pointer from a first position to a second position on a display screen of a display unit,
the transmission unit transmits the instruction to the imaging apparatus at an interval corresponding to an acceleration at which the pointer has moved in a path from the first position to the second position.

4. The control apparatus according to claim 1, wherein the display control unit displays the image and an image captured by the imaging apparatus on a display unit.

5. The control apparatus according to claim 1, wherein the acquisition unit acquires information indicating a first period of time from a first point of time at which the operation has been executed to a second point of time at which the imaging apparatus starts an operation of changing the imaging range according to the operation, and
wherein the display control unit moves the image according to the operation after a time corresponding to the first period of time has elapsed from when the operation was executed.

6. The control apparatus according to claim 1, wherein the display control unit performs control to display, in a first region on a display screen of a display unit, an image within a second range that is contained in a first range within which the imaging apparatus is able to capture an image while changing the imaging range, and if the operation has been executed, to change the image displayed in the first region on the display screen to an image within a third range that is contained in the first range, and
wherein the transmission unit transmits, to the imaging apparatus, an instruction to cause the imaging apparatus to capture an image within an imaging range corresponding to a second region that is a part of the first region on the display screen.

7. A control method for a control apparatus, the control method comprising:
acquiring capability information regarding a speed at which an imaging apparatus changes an imaging range thereof;
moving, if an operation of moving an image for specifying the imaging range within which the imaging apparatus captures an image is executed, the image based on the acquired capability information; transmitting, to the imaging apparatus, an instruction for changing the imaging range according to the operation;
specifying a speed at which the imaging apparatus changes the imaging range according to the operation;
inputting a first instruction for changing display of the image by moving a pointer from a first position to a second position on a display screen of a display unit;
specifying a first speed at which the imaging apparatus changes the imaging range according to a speed at which the pointer has moved from the first position to the second position; and
changing display of the image at a speed corresponding to the specified first speed if the first speed is equal to or lower than a second speed corresponding to the acquired capability information, and changing display of the image at a speed corresponding to the second speed if the first speed is higher than the second speed.

8. A non-transitory computer-readable storage medium storing a program that upon execution by a computer causes the computer to perform a method comprising:
acquiring capability information regarding a speed at which an imaging apparatus changes an imaging range thereof;
moving, if an operation of moving an image for specifying the imaging range within which the imaging apparatus captures an image is executed, the image based on the acquired capability information; transmitting, to the imaging apparatus, an instruction for changing the imaging range according to the operation;
specifying a speed at which the imaging apparatus changes the imaging range according to the operation;
inputting a first instruction for changing display of the image by moving a pointer from a first position to a second position on a display screen of a display unit;
specifying a first speed at which the imaging apparatus changes the imaging range according to a speed at which the pointer has moved from the first position to the second position; and
changing display of the image at a speed corresponding to the specified first speed if the first speed is equal to or lower than a second speed corresponding to the acquired capability information, and changing display of the image at a speed corresponding to the second speed if the first speed is higher than the second speed.

* * * * *